United States Patent Office 2,845,461
Patented July 29, 1958

2,845,461

NON-CATALYTIC LIQUID PHASE ISOBUTANE OXIDATION

De Loss E. Winkler, Orinda, and George W. Hearne, Lafayette, Calif., assignors to Shell Development Company, New York, N. Y., a corporation of Delaware No Drawing. Application April 12, 1956
Serial No. 577,668

12 Claims. (Cl. 260—610)

This invention relates to the production of tertiary-butyl hydroperoxide. The invention relates more particularly to the production of tertiary-butyl hydroperoxide by the direct oxidation of isobutane with molecular oxygen in the liquid phase and in the absence of a catalyst.

Tertiary-butyl hydroperoxide is of value as a starting and intermediate material in the production of valuable chemical derivatives therefrom. It is a starting material in the production of di-tertiary-butyl peroxide, particularly useful because of its ability to improve the cetane number of diesel fuels by its presence. The compound is of value as such in a wide field of applications, particularly as a catalyst in many processes including those involving catalytic polymerization reactions.

As a consequence of its importance in the chemical industry, processes enabling the efficient large-scale production of tertiary-butyl hydroperoxide from readily available materials are greatly sought after. A potential source of the desired tertiary-butyl hydroperoxide is the readily available isobutane. Of the many processes disclosed heretofore involving the direct oxidation of hydrocarbons, none has brought within the realm of practicability the conversion of isobutane to tertiary-butyl hydroperoxide in the liquid phase with a degree of efficiency commensurate with commercial operations. In general, oxidation processes disclosed heretofore are not only executed in the vapor phase but, when applied to the oxidation of isobutane, result in the obtaining of a complex mixture of hydrocarbon oxidation products including, for example, acids, aldehydes, alcohols, ketones, etc., in predominant amount, and wherein peroxidic compounds, if at all present, are present in amounts far below those commensurate with practical scale operations. Certain processes have been disclosed heretofore involving the use of catalysts. Although such materials as, for example, hydrogen bromide, have enabled an increase in the production of certain peroxidic compounds under specific conditions, the effect of many of the oxidation catalysts is to increase the complexity of the reaction mixture obtained and, therefore, the cost of product separation. Additional disadvantages often inherent in the use of many of the catalytic materials resides in aggravation of operational difficulties and increase in over-all cost as a consequence of their corrosive character.

Attempts to effect the direct oxidation of isobutane in the liquid phase heretofore has generally occasioned the use of solvents comprising, for example, organic acids, etc., because of the relatively low critical temperature of isobutane. The presence of such materials tends to increase still further the complexity of the reaction mixture obtained and the difficulties inherent in product separation and recovery.

It is an object of the present invention to provide an improved process enabling the more efficient production of tertiary-butyl hydroperoxide from readily available hydrocarbons comprising isobutane.

Another object of the invention is the provision of an improved process enabling the direct, non-catalytic, liquid phase oxidation of isobutane to reaction products predominating in tertiary-butyl hydroperoxide.

A further object of the invention is the provision of an improved process enabling the direct, non-catalytic, liquid phase oxidation of isobutane to reaction products consisting essentially of tertiary-butyl hydroperoxide and tertiary-butyl alcohol.

Still another object of the invention is the provision of an improved process enabling the direct, non-catalytic, liquid phase oxidation of isobutane to reaction products consisting essentially of tertiary-butyl hydroperoxide and tertiary-butyl alcohol, wherein the ratio of these products to one another can be controlled.

Still another object of the invention is the provision of an improved process enabling the direct, non-catalytic, liquid phase oxidation of isobutane to reaction products comprising substantial amounts of tertiary-butyl hydroperoxide at temperatures above the critical temperature of isobutane in the absence of added solvents. Other objects and advantages of the invention will become apparent from the following detailed description thereof.

It has now been found that reaction products consisting essentially of tertiary-butyl hydroperoxide and tertiary-butyl alcohol are obtained with unusually high yields by reacting isobutane with molecular oxygen in the liquid phase at a temperature of from about 100° to about 150° C. and a pressure of at least 400 p. s. i. g. in a reaction medium in which the presence of any substantial amount of metal ions is excluded.

Isobutane oxidized in accordance with the invention is preferably free of any other hydrocarbons. The invention is, however, not limited to the use of only essentially pure isobutane. Thus, the presence of normal butane in the charge may be tolerated; the isobutane being preferably oxidized in the presence of the normal compound. The presence of other hydrocarbons is, however, preferably excluded with the exception of certain aromatic hydrocarbons such as, for example, benzene, which may at times be employed as diluent for the reaction.

The oxygen employed as a reactant in the process may be obtained from any suitable source and may comprise, for example, essentially pure oxygen, or molecular oxygen in admixture with inert fixed gas as, for example, air, commercial oxygen diluted with nitrogen and/or air, etc.

Reaction of the oxygen with the isobutane in accordance with the invention is carried out in a reaction medium in which tertiary-butyl hydroperoxide is stable under the conditions of operation. By a medium which is stable under the conditions of execution of the invention is meant a reaction medium which is devoid of any substantial amount of metals in the ionic state. In addition, the introduction of any substantial amounts of compounds containing reactive groups such as, for example, acids of organic or inorganic character, etc., into the reaction zone from an outside source is strictly avoided. Essential to the attainment of the objects of the invention is the maintenance of the reaction medium free of such metallic ions and/or reactive compounds. Necessary to the attainment of the metal ion-free reaction medium is the use of a reaction zone wherein the surfaces in contact with the reaction mixture are formed essentially of materials incapable of introducing such undesired ions into the reaction system. Thus, the reaction zone may comprise reactors, of the chamber and/or tubular type, wherein all surfaces in contact with the reaction mixture consist of a relatively inert material such as, for example, glass, ceramic, porcelain, or similar non-porous, smooth-surfaced, non-catalytic materials. The use of reactors comprising a surface of stainless steel, tin, titanium or tantalum, in contact with the reaction mixture is, however, comprised within the scope of the invention. The use of these materials under the conditions defined herein, it has been found, does not result in the introduction of any substantial amount of metal in ionic form into the reaction mixture. When employing reactors having a stainless steel surface in contact with the reactants, such surface is preferably treated prior to use to eliminate therefrom metal particles or ions capable of being transferred to the reaction mixture during the course of the operation. The treatment may comprise a suitable passivation treatment, for example, with a nitric acid followed by thorough washing to remove all trace of the acid.

To aid in maintaining the desired metal ion-free condition within the reaction zone, materials charged thereto may be subjected to suitable treatment to avoid introduction of such materials by entrainment.

Essential to the attainment of the objects of the invention is the maintenance of at least a substantial part of the isobutane in the liquid phase throughout the course of the operation. The presence of substantial amounts of isobutane in the vapor phase during the course of the operation it has been found will result in the production of substantial amounts of by-products other than the desired tertiary-butyl hydroperoxide with a corresponding decrease in the production of the desired product. Pressures employed within the scope of the invention comprise those sufficiently high to maintain at least a substantial part of the isobutane component of the reaction mixture in the liquid phase throughout the course of the operation. In general, a minimum pressure of about 400 p. s. i. g., preferably at least about 500 p. s. i. g., is employed. Maximum pressures may vary within the scope of the invention. In general, it has been found that the pressure of 700 p. s. i. g. need not be exceeded. Higher pressures may, however, be employed within the scope of the invention. A particularly desirable pressure range comprises that within the range of from about 570 to about 650 p. s. i. g.

The isobutane oxidation in accordance with the invention is carried out at a temperature in the range of from about 100° C. to about 150° C. Higher temperatures, though not essential to the attainment of the objects of the invention, may be employed within the scope thereof.

The contact time employed may vary considerably within the scope of the invention and is governed to some extent by the extent of conversion desired. At a temperature of 125° C., for example, a conversion of about 4% and higher per hour to the desired reaction products comprising tertiary-butyl hydroperoxide and tertiary-butyl alcohol is readily attained. Reaction rates increase directly with increase in temperature within the above-described permissible range. The critical temperature of isobutane is, however, relatively low, e. g., 134° C. Though execution of the process at temperatures below the critical temperature is at times desirable because of the higher yields of tertiary-butyl hydroperoxide attainable at these lower temperatures, the reaction rates are, however, considerably lower than those attainable at the higher temperatures. Thus, at a temperature of, for example, about 125° C., a conversion to the desired products consisting essentially of tertiary-butyl hydroperoxide and tertiary-butyl alcohol of about 4% per hour is attained.

However, when the oxidation is executed at a temperature of 135° C., the production rate is increased to about 8% per hour at substantially the same conversion level.

Execution of the oxidation in the liquid phase at temperatures above 134° C. entails the use of a solvent. Solvents heretofore generally employed in oxidation reactions comprising, for example, the organic acids, such as the lower aliphatic carboxylic acids, are, however, found to result in decomposition of the desired tertiary-butyl hydroperoxide. The use of these solvents is, furthermore, precluded because their corrosive nature in the presence of stainless steel results in the introduction of metal ions into the system. These metal ions function to further suppress the formation in representative yields of the desired tertiary-butyl hydroperoxide.

It has now been found, however, that isobutane can be oxidized efficiently to products consisting essentially only of tertiary-butyl hydroperoxide and tertiary-butyl alcohol in the liquid phase at temperatures above 134° C. without the need of solvents from an external source by effecting the reaction in the presence of a reaction medium consisting of an admixture of isobutane and isobutane oxidation products consisting predominantly of tertiary-butyl hydroperoxide and tertiary-butyl alcohol. The suitable reaction medium is obtained by first subjecting isobutane to oxidation in the liquid phase as defined hereinabove at a temperature below the critical temperature of isobutane, e. g. 134° C., for example, in the range of from about 100 to about 133° C., preferably at about 110° to about 130° C., until a conversion of isobutane of at least 20% and not exceeding about 60%, preferably from about 30 to about 50%, conversion has been attained. The resulting reaction mixture consisting essentially of isobutane, tertiary-butyl hydroperoxide and tertiary-butyl alcohol is thereupon used as the reaction medium for effecting the oxidation of further quantities of isobutane in the liquid phase at temperatures above 135° C. Thus, temperatures in the second stage of the process in the range of from about the critical temperature of isobutane to about 150° C. are employed. When thus employing a two-stage operation, the oxidation can be carried out batchwise, semi-continuously or continuously. In continuous operation, isobutane charge is continuously introduced into the reaction system and a portion of the reaction mixture is continuously withdrawn from the high temperature stage.

Contact of the oxygen with the liquid isobutane in the process of the invention is brought about in a reaction zone comprising reactors of conventional design. Thus, in a suitable method of operation oxygen-containing charge is introduced into a liquid pool of isobutane in a reaction chamber. Normally gaseous material comprising residual oxygen is continuously vented from the reaction zone. Introduction of oxygen into the reaction zone is preferably controlled to result in consumption of at least a substantial part of the oxygen so introduced in the oxidation reaction zone. In a preferred method of operation, a slight excess of oxygen over that which will be consumed under the conditions employed is generally introduced into the reaction zone. Thus, the introduction of the oxygen-containing charge into the reaction zone may suitably be controlled to result in an oxygen content of, for example, in the range of from about 1 to about 10%, and preferably from about 3 to about 7%, in the off-gas leaving the reactor when employing air as the oxygen-containing charge.

The process of the invention may be executed in batch, semicontinuous or continuous operation. Effluence from the reaction zone is introduced into a product separating zone wherein it is subjected to conventional product separating means. Within the product separating zone, the reactor effluence may be subjected to one or more such steps as, for example, evaporation, distillation, extractive distillation, solvent extraction, etc. Tertiary-butyl hydroperoxide may be recovered as a separate product, or in admixture with the tertiary-butyl alcohol, in the product separating zone. Unconverted isobutane separated from the reactor effluence is recycled to the system.

Materials capable of promoting the reaction including peroxides, for example, tertiary-butyl hydroperoxide and/or di-tertiary-butyl peroxide, may be added to the charge to the system within the scope of the invention. The primary function of the promoter is to shorten the induction period. It is to be pointed out, however, that the peroxidic compounds are in nowise equivalent and vary in specific effect upon the behavior of the reaction. Thus, when adding di-tertiary-butyl peroxide as promoter, a rapid reduction of induction period is encountered, but its presence has been found to result in a decrease in the yield of desired tertiary-butyl hydroperoxide and an increase in tertiary-butyl alcohol. Tertiary-butyl hydroperoxide, on the other hand, when used as a promoter, though somewhat less effective in reducing the initial induction period, functions to accelerate the reaction rate without reducing the formation of desired tertiary-butyl hydroperoxide. The peroxidic compounds when thus employed as promoters need be added in only relatively small amounts. Thus, the addition in amount equivalent to about 0.1% to about 1.0% of the isobutane charge has been found to be satisfactory. Higher or lower proportions may, however, be employed within the scope of the invention.

Under the above-defined conditions, isobutane and molecular oxygen interact with the formation of reaction products consisting of tertiary-butyl hydroperoxide

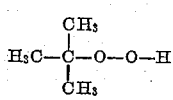

and tertiary-butyl alcohol.

An advantage of the process of the invention resides in the ability to convert the isobutane with yields heretofore unattained to reaction products consisting essentially of tertiary-butyl hydroperoxide and tertiary-butyl alcohol in a liquid phase operation. In addition to the advantage of the obtaining of these desired products with high yields, the process has the advantage of producing these materials as a mixture free of substantial amounts of contaminants in the form of by-products or of materials added to the process as solvents, catalysts or the like. Not only is the reaction product, consisting essentially of tertiary-butyl hydroperoxide and tertiary-butyl alcohol, obtained in the absence of any substantial amount of such by-products as aldehydes, ketones and degradation products but also of peroxidic products such as di-tertiary-butyl peroxide. Product recovery thus produces no problems in its application in the process of the invention.

A particular advantage of the process of the invention resides in the ability to control the oxidation to obtain reaction products comprising a specifically desired ratio of tertiary-butyl hydroperoxide to tertiary-butyl alcohol. Such control is readily obtained by varying operating variables such as conversion and/or contact time. The ratio of tertiary-butyl hydroperoxide to tertiary-butyl alcohol, it has been found, decreases with increase in overall conversion. Thus, the process enables the production of products predominating in tertiary-butyl hydroperoxide; or it can be made to produce at will a reaction product containing the tertiary-butyl hydroperoxide and tertiary-butyl alcohol in proportions particularly suitable for further use. Thus, the process enables the production of a reaction product consisting essentially of equal molar parts of tertiary-butyl hydroperoxide and tertiary-butyl alcohol at conversions above about 30% up to about 70% and higher. As disclosed and claimed in copending application Serial No. 580,992, filed April 27, 1956, the reactor effluence, comprising these two components in substantially equal molecular amounts, is readily converted to di-tertiary-butyl peroxide by the direct addition of acid catalyst thereto.

Conventional means are used to maintain the desired reaction conditions defined herein. Thus, the reactants to the process are preferably preheated in the initial stages of the process by conventional means. Once the reaction is underway, exothermic heat is withdrawn from the reactor by conventional means. Thus, the charge to the reactor may be cooled and heat exchange fluids may be circulated about, or through, the reaction zone to aid in the withdrawal of heat therefrom.

Example I

Isobutane was oxidized with molecular oxygen in a continuous operation "A" by passing air through 800 grams of liquid isobutane containing 5 grams of di-tertiary-butyl peroxide in a stainless steel reactor. The contents of the reactor were maintained at a temperature of 125° C. and a pressure of 600 p. s. i. g. After a period of 4 hours controlled amounts of reactor contents were withdrawn and replaced by fresh isobutane. Effluent from the reactor was analyzed for tertiary-butyl hydroperoxide. Care was taken to avoid the introduction of any substantial amount of metal ions into the reaction zone throughout the course of the operation. In this manner tertiary-butyl hydroperoxide and tertiary-butyl alcohol were produced at the rate of 22 grams per hour. After 45 hours of operation a conversion to total oxidation products of 72.2% based on isobutane charge was being obtained. 94% of the oxidation products thus obtained consisted of tertiary-butyl hydroperoxide and tertiary-butyl alcohol. 46% of the total oxidation products consisted of tertiary-butyl hydroperoxide. The remaining 6% of the reaction product consisted essentially of acetone, methanol, formic acid and $CO_2$. The tertiary-butyl hydroperoxide equivalent per 100 grams of product, as determined by iodometric method of the isobutane-free oxidation product, was found to be 1.14.

In continuous operation under the conditions of the foregoing operation "A," the total oxidation products obtained at an isobutane conversion of 19.6% were found to have a tertiary-butyl hydroperoxide equivalence of 1.55 per 100 grams of product. 96% of the total conversion products consisted of tertiary-butyl hydroperoxide and tertiary-butyl alcohol. 64.3% of the total oxidation products was found to be tertiary-butyl hydroperoxide.

Example II

Isobutane was oxidized with molecular oxygen by passing air through 800 grams of liquid isobutane, containing 5 grams of di-tertiary-butyl peroxide, in a stainless steel reactor maintained at a temperature of 125° C. and 600 p. s. i. g. for a period of 10 hours. Care was taken to exclude metal ions from entering the reactor. Analysis of the reaction products obtained showed a conversion of 35% to total oxidation products, 95% of which consisted of tertiary-butyl hydroperoxide and tertiary-butyl alcohol. 60% of the total oxidation products consisted of tertiary-butyl hydroperoxide. The reaction products obtained were found to have a tertiary-butyl hydroperoxide equivalence per 100 grams of product of 1.39.

Example III

Isobutane was oxidized by bubbling oxygen through 800 grams of liquid isobutane in a stainless steel reactor maintained at a temperature of 125° C. and at a pressure of 600 p. s. i. g. Five grams of tertiary-butyl hydroperoxide was added to the charge as promoter before initiating the operation. The passage of air through the reactor was continued for a period of 4 hours, thereupon the reactor was cooled and contents analyzed. Oxidation products consisting of tertiary-butyl hydroperoxide and tertiary-butyl alcohol were obtained with a yield of 97%. 83.5% of the total reaction products obtained consisted of tertiary-butyl hydroperoxide. The total reaction products obtained were found to have a tertiary-butyl hydroperoxide equivalent per 100 grams of 1.72 by the iodometric method. No detectable amount of di-tertiary-butyl peroxide was found in the products obtained.

Example IV

To 357 grams of isobutane oxidation product consisting of tertiary-butyl hydroperoxide and tertiary-butyl alcohol having a hydroperoxide equivalent of 1.45 per 100 grams, there was added 500 grams of isobutane. The resulting mixture was oxidized by passing air therethrough in a stainless steel reactor at a temperature of 135° C. and a pressure of 600 p. s. i. g. Passage of oxygen through the liquid contents of the reactor continued for a period of 41 hours. During this time oxidation products were formed at the rate of 40.5 grams/hour while maintaining the conversion level around 50% by withdrawal of reaction mixture and the addition of makeup isobutane. The isobutane-free reaction products were found to have a tertiary-butyl hydroperoxide equivalent per 100 grams of 1.18. 94% of the total oxidation products consisted of tertiary-butyl hydroperoxide and tertiary-butyl alcohol. The remainder of the oxidation products consisted essentially of acetone, methanol, formic acid, and $CO_2$.

In a repetition of the operation carried out under substantially identical conditions but with the exception that the temperature was maintained at 125° C. and a production rate of tertiary-butyl hydroperoxide plus tertiary-butyl alcohol of 22 grams per hour was attained.

*Example V*

Isobutane was oxidized by passing oxygen through 800 grams of liquid isobutane, to which 5 grams of di-tertiary-butyl peroxide had been added, in a stainless steel reactor at a temperature of 125° C. and 600 p. s. i. g. Care was taken to exclude all metal ions from the reaction mixture. The operation was continued until 59% of the isobutane was converted.

Analysis of the resulting reaction products showed a tertiary-butyl hydroperoxide equivalent per 100 grams of 1.27.

To determine the effect of added metallic ions the operation was repeated under substantially identical conditions and to the same conversion, but with the exception that approximately 5 grams of cobalt naphthenate was introduced into the charge before initiating the operation. Analysis of the resulting reaction products showed them to have a tertiary-butyl hydroperoxide equivalent per 100 grams of only 0.35% as determined by iodometric method.

*Example VI*

Isobutane was oxidized by passing air through 800 grams of liquid isobutane containing 5 grams of di-tertiary-butyl peroxide, in a stainless steel reactor at 125° C. and 600 p. s. i. g. for a period of 7.5 hours. The reactor employed was one in which a cobalt catalyst had been present during a previous completed operation. No special effort to remove residual cobalt-containing contaminants from the reactor surface were resorted to other than successive washing with water and acetone, before initiating the present operation. Analysis of the reaction products obtained showed a tertiary-butyl hydroperoxide equivalent per 100 grams of only 0.58 at a conversion of isobutane to total oxidation products of 30%. The yield of tertiary-butyl hydroperoxide amounted to only 23% of the total reaction products obtained.

The foregoing run was repeated, under substantially identical conditions, but with the exception that all traces of cobalt-containing contaminants were removed from the stainless steel reactor by a cleaning and passivation operation before use. In the cleaning operation the reactor was in contact with 30% nitric acid for a period of 2 hours at 100° C. Thereafter, the reactor surfaces were washed thoroughly with water followed by a rinse with a 2% solution of sodium pyrophosphate which acts as a scavenger for metal ions. With the use of the metal ion-free reactor, oxidation products having a tertiary-butyl hydroperoxide equivalent per 100 grams of 1.36 were obtained with an isobutane conversion of 23%. Of the total oxidation products obtained 60% consisted of tertiary-butyl hydroperoxide.

We claim as our invention:

1. The non-catalytic, liquid phase process for the production of reaction products consisting predominantly of tertiary-butyl hydroperoxide and tertiary-butyl alcohol which comprises reacting isobutane with molecular oxygen in the liquid phase at a temperature above about 100° C. but not substantially above about 150° C. and a pressure above about 400 p. s. i. g. in a metal ion-free reaction medium.

2. The process in accordance with claim 1 wherein said liquid phase oxidation is executed at a temperature of from about 100° C. to about 150° C. and at a pressure of from about 500 to about 700 p. s. i. g.

3. The non-catalytic, liquid phase process for the production of reaction products consisting predominantly of tertiary-butyl hydroperoxide and tertiary-butyl alcohol which comprises reacting isobutane in the liquid phase with molecular oxygen at a temperature of from about 100° C. to about 134° C. and at a pressure of from about 500 to about 700 p. s. i. g. in a metal ion-free reaction medium.

4. The process in accordance with claim 3 wherein said oxidation is carried out in the liquid phase at a pressure of from about 570 to about 650 p. s. i. g.

5. The process for the production of reaction products consisting essentially of tertiary-butyl hydroperoxide and tertiary-butyl alcohol which comprises passing molecular oxygen through isobutane maintained in the liquid phase in a reaction medium consisting essentially of said isobutane and its oxidation products at a temperature of from about 100° C. to about 150° C., at a pressure in excess of 400 p. s. i. g., in a reaction zone free of any substantial amount of metal in the ionic state, thereby reacting said isobutane with said molecular oxygen in said reaction zone with the formation of reaction products consisting predominantly of tertiary-butyl hydroperoxide and tertiary-butyl alcohol.

6. The non-catalytic process for the production of reaction products consisting essentially of tertiary-butyl hydroperoxide and tertiary-butyl alcohol in substantially about equimolar amounts which comprises passing a molecular oxygen-containing gas through isobutane maintained in the liquid state, at a temperature of from about 100° C. to about 150° C., at a pressure of from about 500 to about 700 p. s. i. g. in a reaction zone free of any substantial amount of metal in the ionic state, and continuing said passage of said molecular oxygen gas through said isobutane in the liquid phase until at least about 30% of said isobutane has reacted with said molecular oxygen thereby converting isobutane to reaction products consisting essentially of tertiary-butyl hydroperoxide and tertiary-butyl alcohol in substantially equimolar amounts in said reaction zone.

7. The process for the production of reaction products consisting essentially of tertiary-butyl hydroperoxide and tertiary-butyl alcohol which comprises reacting isobutane in the liquid phase with molecular oxygen at a temperature in excess of about 135° C. but not substantially above about 150° C., at a pressure above about 400 p. s. i. g. in a substantially metal-ion free liquid reaction medium consisting essentially of the reaction mixture obtained by reacting isobutane with molecular oxygen in the liquid phase at a temperature below 134° C., but not substantially below about 100° C., and at a pressure above about 400 p. s. i. g.

8. The process in accordance with claim 7 wherein said oxidation carried out in the liquid phase above about 135° C. is executed at a temperature of from about 135° C. to about 150° C. and at a pressure of from about 500 to about 700 p. s. i. g.

9. The process in accordance with claim 8 wherein said oxidation carried out in the liquid phase at a temperature in the range of from about 135° C. to about 150° C. is executed at a pressure of from about 570 to about 650 p. s. i. g.

10. The process for the non-catalytic liquid phase conversion of isobutane to reaction products consisting essentially of tertiary-butyl hydroperoxide and tertiary-butyl alcohol which comprises, reacting molecular oxygen with isobutane in the liquid phase in a reaction zone substantially free of metals in the ionic state at a temperature of from about 100° C. to about 134° C., at a pressure above about 400 p. s. i. g. until at least 20% of the isobutane in said reaction zone has reacted with molecular oxygen, thereafter continuing the reaction of molecular oxygen with isobutane in the liquid phase in said reaction zone at a temperature in excess of about 135° C. but not substantially above about 150° C. without any substantial reduction in pressure, thereby reacting isobutane with molecular oxygen in said reaction zone with the formation of reaction products consisting essentially of tertiary-butyl hydroperoxide and tertiary-butyl alcohol.

11. The process in accordance with claim 10 wherein said pressure in said reaction zone is maintained in the range of from about 500 to about 700 p. s. i. g.

12. The process in accordance with claim 11 wherein said reaction of molecular oxygen with isobutane in the liquid phase at a temperature in the range of from about 100° C. to about 134° C. is continued until at least 30% of the isobutane in said reaction zone has reacted with molecular oxygen before raising the temperature above about 135° C.

References Cited in the file of this patent

UNITED STATES PATENTS

| | | |
|---|---|---|
| 2,376,257 | Lacomble | May 15, 1945 |
| 2,395,523 | Vaughn et al. | Feb. 26, 1946 |

OTHER REFERENCES

Ivanov et al.: Chem. Abstracts, vol. 42, p. 6739 (1948).